United States Patent [19]

Renfrew et al.

[11] 4,080,369

[45] Mar. 21, 1978

[54] DISPERSE ANTHRAQUINONE DYESTUFFS

[75] Inventors: Andrew Hunter Morris Renfrew; Stephen Bernard Bostock, both of Manchester, England

[73] Assignee: Imperial Chemical Industries Limited, London, England

[21] Appl. No.: 779,952

[22] Filed: Mar. 21, 1977

[30] Foreign Application Priority Data

Mar. 25, 1976 United Kingdom ............... 12018/76

[51] Int. Cl.$^2$ ...................... C07C 101/80; C09B 1/503
[52] U.S. Cl. ..................... 260/376; 8/39 R; 8/39 A; 8/39 B; 8/39 C; 8/39 D; 8/40; 260/377
[58] Field of Search .................. 260/376, 377; 8/39 B, 8/39 C, 40

[56] References Cited

U.S. PATENT DOCUMENTS

| 1,917,421 | 7/1933 | Baumann | 260/376 |
|---|---|---|---|
| 3,349,104 | 10/1967 | Lodge | 260/376 |
| 3,538,129 | 11/1970 | Sato et al. | 260/376 |
| 3,803,168 | 4/1974 | Kolliker et al. | 8/39 C X |
| 3,806,524 | 4/1974 | Kolliker et al. | 260/376 |
| 3,929,842 | 12/1975 | Yamada et al. | 260/376 |
| 3,936,477 | 2/1976 | Maier et al. | 8/39 C X |

FOREIGN PATENT DOCUMENTS

| 631,581 | 11/1963 | Belgium | 260/376 |
|---|---|---|---|
| 1,352,732 | 1/1964 | France | 260/376 |
| 44-15316 | 7/1969 | Japan | 260/376 |
| 44-28393 | 11/1969 | Japan | 260/376 |

OTHER PUBLICATIONS

Leonard, "Organic Chemical Reagents, Monograph No. 45", *Alizarin Fluorine Blue*, Hopkin & Williams Ltd., 1962.

*Primary Examiner*—Daniel E. Wyman
*Assistant Examiner*—John J. Doll
*Attorney, Agent, or Firm*—Cushman, Darby & Cushman

[57] ABSTRACT

1,4-Di(hydroxy- or amino-)-2-[alkoxycarbonylmethylene(oxy or amino)phenyl(oxy)]anthraquinones. Disperse dyestuffs for synthetic textile materials, especially aromatic polyesters.

10 Claims, No Drawings

DISPERSE ANTHRAQUINONE DYESTUFFS

This invention relates to disperse anthraquinone dyestuffs which are valuable for colouring synthetic textile materials, in particular aromatic polyester textile materials.

According to the invention there are provided the disperse anthraquinone dyestuffs free from sulphonic acid and carboxylic acid groups which are of the formula:

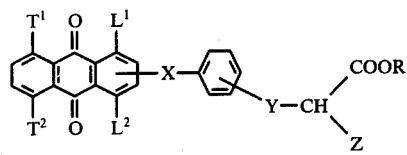

wherein $T^1$ and $T^2$ are each independently hydrogen, hydroxy, amino or N-lower alkylamino;
$L^1$ and $L^2$ are each independently hydroxy, amino or N-lower alkylamino;
X is a direct link or an oxygen atom;
Y is an oxygen atom or an amino group,
R is an optionally substituted hydrocarbon radical;
Z is a —COOR, nitrile or carboxylic acid amide group,
and the anthraquinone nucleus can contain up to three chlorine or bromine atoms.

Throughout this Specification the terms "lower alkyl" and "lower alkoxy" are used to denote alkyl and alkoxy respectively containing from 1 to 4 carbon atoms.

As examples of N-lower alkylamino represented by $T^1$, $T^2$, $L^1$ and $L^2$ there may be mentioned methylamino, ethylamino, n-propylamino and n-butylamino.

It is preferred that both $T^1$ and $T^2$ are hydrogen atoms.

The optionally substituted hydrocarbon radicals represented by R are preferable optionally substituted alkyl, cycloalkyl or phenyl radicals. As examples of substituted phenyl radicals represented by R there may be mentioned tolyl, xylyl, chlorophenyl, bromophenyl and anisyl. As examples of cycloalkyl represented by R there may be mentioned cyclopentyl and cyclohexyl. It is however preferred that R is an optionally substituted alkyl radical, and, above all, an optionally substituted lower alkyl radical. As examples of alkyl radicals represented by R there may be mentioned n-hexyl, 2-ethyl-n-hexyl, n-octyl and n-decyl, but more especially lower alkyl such as methyl, ethyl, n-propyl, isopropyl, n-butyl and sec-butyl. As examples of substituted lower alkyl radicals represented by R there may be mentioned hydroxy lower alkyl such as β-hydroxyethyl, lower alkoxy lower alkyl such as β-ethoxyethyl and γ-methoxypropyl, and phenyl lower alkyl such as benzyl and β-phenylethyl.

The carboxylic acid amide groups represented by Z are preferably of the formula:

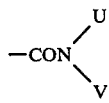

wherein U is hydrogen, lower alkyl or phenyl, and V is hydrogen or lower alkyl.

Preferably Z is a —COOR group.

According to a further feature of the invention there is provided a process for the manufacture of the anthraquinone dyestuffs of the invention which comprises reacting on anthraquinone compound, of the formula:

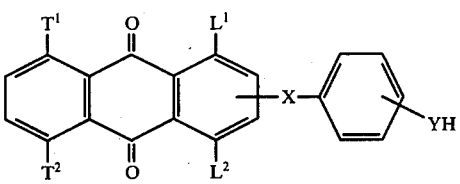

with a halogeno ester of the formula:

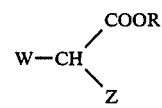

wherein $T^1$, $T^2$, $L^1$, $L^2$, X, Y, R and Z have the meanings stated, W is a chlorine or a bromine atom, and tha anthraquinone nucleus can contain up to three chlorine or bromine atoms.

The process of the invention can be conveniently carried out, for example, by heating the said anthraquinone compound and the halogenoester together in the presence of an acid-binding agent and an inert liquid medium, which can be water or an organic liquid or a mixture thereof. The resulting dyestuff is then isolated in conventional manner, for example by filtering off the precipitated dyestuff, or by adding a liquid in which the dyestuff is insoluble and then filtering off the dyestuff.

If desired the liquid medium can comprise a basic organic liquid such as pyridine or quinoline, in which case it is not necessary to additionally include an acid-binding agent.

As examples of acid-binding agent there may be mentioned sodium or potassium carbonates.

As examples of organic liquids there may be mentioned chlorobenzene, toluene, xylene, dichlorobenzene, dimethylformamide and dimethylsulphoxide.

As specific examples of the halogeno esters there may be mentioned diethyl chloromalonate, dimethyl bromomalonate, ethyl chloroacetoacetate, methyl chloro-cyanoacetate, and ethyl chloro-carboxamidoacetate.

The anthraquinone compounds used as starting materials in the process of the invention are themselves known compounds and are prepared by conventional methods of synthesis. As specific examples of the said compounds there may be mentioned 1-(amino- or hydroxy-)-2-(p-hydroxyphenoxy)-4-(amino- or hydroxy-)anthraquinone, 1-(amino-, methylamino- or hydroxy-)-2-(m- or p-hydroxyphenyl)-4-(amino- or hydroxy-)anthraquinone, 1-(amino- or hydroxy-)-2-(m- or p-aminophenoxy)-4-(amino- or hydroxy-)-6-(or -7-) (chloro- or bromo-) anthraquinone and 1:5-dihydroxy-4:8-diamino-2-(p-hydroxyphenyl)anthraquinone.

Alternatively the anthraquinone dyestuffs of the invention which contains from 1 to 3 chlorine or bromine atoms can be obtained by chlorination or bromination of the corresponding dyestuffs which do not contain such atoms. Such chlorinated or brominated derivatives can be obtained by treating the corresponding dyestuffs which do not contain such atoms with chlorine or bromine in the presence of a halogenation catalyst such as iodine and in a liquid medium such as chlorobenzene or nitrobenzene.

The anthraquinone dyestuffs of the invention when dispersed in aqueous medium are valuable for colouring synthetic textile materials (such as cellulose acetate, polyamide and aromatic polyester textile materials) by aqueous dyeing, padding or printing processes using the methods and conditions which are conventionally employed in colouring such textile materials. The said anthraquinone dyestuffs are especially valuable for colouring aromatic polyester textile materials as the dyestuffs have excellent build up and dyeing properties on such textile materials, and the resulting colourations have very good to excellent fastness to the tests conventionally applied to such textile materials, in particular to light, to wet treatments, to perspiration and to dry heat tests. The dyestuffs also have the valuable property that any unfixed dyestuff can readily be removed from the surface of the textile material by treatment in an aqueous solution of an alkali, for example a 0.2% w/w solution of sodium hydroxide, at a temperature in the region of 80° C.

The said anthraquinone dyestuffs can also be used for mass colouring synthetic materials, or can be applied to synthetic textile materials by the process of transfer printing, this being optionally carried out under humid conditions or at reduced air pressures.

The invention is illustrated but not limited by the following Examples in which the parts and percentages are by weight.

EXAMPLE 1

A mixture of 13.8 parts of 1-amino-2-(p-hydroxyphenoxy)-4-hydroxyanthraquinone, 5.6 parts of potassium carbonate and 15 parts of water are heated for 2 hours at 150° C whilst distilling off the water. 15 Parts of dimethylformamide are added and the mixture stirred for 15 minutes at 100° C. 9.6 Parts of diethyl chloromalonate are finally added and stirring continued for 1 hour at 100° C. The mixture is cooled to 10° C, 400 parts of methanol added, and the precipitated solid is filtered off, washed with water and dried.

After crystallisation from ethyl acetate the 1-amino-2-[p-(bis(ethoxycarbonyl)methoxy)phenoxy]-4-hydroxyanthraquinone melts at 122° C.

When dispersed in aqueous medium the dyestuff dyes aromatic polyester textile materials in red shades, and any unfixed dyestuff on the surface of the textile material is readily removed by washing in an 0.2% aqueous solution of sodium hydroxide at 80° C. The resulting coloured textile material has very good to excellent fastness to the tests conventionally applied to such textile materials.

EXAMPLE 2

A mixture of 25 parts of 1-amino-2-p-hydroxyphenoxy-4-p-toluenesulphonamidoanthraquinone, 4.32 parts of potassium carbonate and 100 parts of water are heated, with stirring, for 2 hrs. at 150° C, whilst distilling off the water. The resultant solid is cooled to 65° C, 70 parts of dimethylformamide are added and finally 12.2 parts of chlorodiethylmalonate. The temperature is raised to 85° C for 2 hours, then cooled to 55° C and 150 parts of methanol are added. The precipitate so formed is filtered off, washed with methanol and with water, and dried to give 24.5 parts of 1-amino-2-[p-bis(ethoxycarbonyl)methoxy]phenoxy-4-p-toluenesulphonamidoanthraquinone, m.p. 170° C.

Hydrolysis of this product is carried out in 98% w/w sulphuric acid at 20° to yield the desired 1,4-diamino-2-[p-bis (ethoxycarbonyl)methoxy]phenoxyanthraquinone, m.p. 92°–95° C.

When dispersed in aqueous medium the dyestuff colours aromatic polyester textile material in bluish red shades, and any unfixed dyestuff on the surface of the textile material is readily removed by washing in a 0.2% w/w aqueous solution of sodium hydroxide at 80° C. The resultant coloured textile material has very good fastness to the tests conventionally applied to such textile materials.

EXAMPLE 3

A mixture of 17.9 parts of 1-amino-2-(m-hydroxy)-phenoxy-4-hydroxyanthraquinone, 3.5 parts of potassium carbonate and 20 parts of water is heated for 2 hours at 150° C whilst distilling off the water. 20 Parts of dimethylsulphoxide are added and the mixture is stirred at 100° C for 30 minutes. 10 Parts of ethylchlorocyanoacetate are finally added and stirring continued for 1 hour at 100° C. The mixture is cooled to room temperature, 400 parts of methanol are added and the precipitated solid is filtered off, washed with water and dried to give 12 parts of 1-amino-2-[m(α-ethoxycarbonyl-α-cyano)methoxy]phenoxy-4-hydroxy anthraquinone as a dark red solid.

When applied to polyester as described in Example 2 it yields bright red shades with good alkali clearing and fastness properties.

EXAMPLE 4

A mixture of 3.6 parts of 1,5-diamino-4,8-dihydroxy-2-(p-hydroxyphenyl)anthraquinone, 1.4 parts of potassium carbonate and 10 parts of water is heated at 110°–120° C for 2 hours, then cooled to 95° C. 6 Parts of dimethylformamide and 3.9 parts of chlorodiethylmalonate are added and the reaction mixture is stirred for ½ hour. The solution is cooled to room temperature, 75 parts of methanol are added and the precipitate so formed is filtered off, washed with water and dried. 2.9 Parts of 1,5-diamino-4,8-dihydroxy-2-[p-bis(ethoxycarbonyl)methoxy] phenylanthraquinone, a dark blue solid, m.p. 195°–200° C, are obtained.

When dispersed in aqueous medium the dyestuff colours aromatic polyester textile material in reddish blue shades which exhibit very good fastness properties.

The invention is further exemplified by the dyes shown in Table I, which are prepared by methods similar to those described above.

The table headings T, $T^2$, $L^1$, $L^2$, X, Y, R and Z have the meanings hereinbefore stated.

TABLE I

| Ex. No. | $T^1$ | $T^2$ | $L^1_1$ | $L^2_2$ | X | Y | R | Z | Shade |
|---|---|---|---|---|---|---|---|---|---|
| 5 | H | H | $NH_2$ | OH | O | para O | $CH_3$ | $CO_2CH_3$ | Red |
| 6 | H | H | $NH_2$ | OH | O | para O | phenyl | $CO_2$—phenyl | Red |
| 7 | H | H | $NH_2$ | OH | O | meta O | $n-C_3H_7$ | $CO_2nC_3H_7$ | Red |
| 8 | H | H | $NH_2$ | $NH_2$ | O | para O | $CH_3$ | $CO_2CH_3$ | Bluish-Red |

We claim

1. Disperse anthraquinone dyestuffs free from sulphonic acid and carboxylic acid groups, which are of the formula:

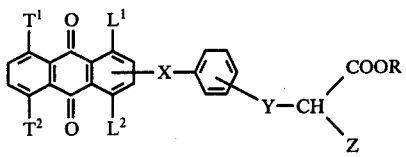

wherein $T^1$ and $T^2$ are each independently selected from the class consisting of hydrogen, hydroxy, amino and N-lower alkylamino;

$L^1$ and $L^2$ are each independently selected from the class consisting of hydroxy, amino and N-lower alkylamino;

X is selected from the class consisting of a direct link and an oxygen atom;

Y is selected from the class consisting of an oxygen atom and an amino group;

R is selected from the class consisting of unsubstituted and substituted hydrocarbon radicals;

Z is selected from the class consisting of —COOR, nitrile and carboxylic acid amide groups, and the anthraquinone nucleus can contain up to three atoms selected from chlorine and bromine.

2. Disperse anthraquinone dyestuffs, free from sulphonic acid and carboxylic acid groups, which are of the formula defined in claim 1 wherein $T^1$ is selected from the class consisting of a hydrogen atom and a hydroxyl group;

$T^2$ is selected from the class consisting of a hydrogen atom and a primary amino group;

$L^1$ is a primary amino group;

$L^2$ is selected from the class consisting of a hydroxyl group and a primary amino group;

X is selected from the class consisting of a direct link and an oxygen atom;

Y is an oxygen atom;

R is selected from the class consisting of lower alkyl radicals and the phenyl radical, and Z is selected from the class consisting of lower alkoxycarbonyl, phenoxycarbonyl and nitrile radicals.

3. The dyestuff claimed in claim 2 wherein $T^1$ and $T^2$ are hydrogen, $L^1$ is $NH_2$, $L^2$ is OH, X is oxygen, Y is oxygen in the para-position to X, R is ethyl and Z is ethoxycarbonyl.

4. The dyestuff claimed in claim 2 wherein $T^1$ and $T^2$ are hydrogen, $L^1$ and $L^2$ are $NH_2$, X is oxygen, Y is oxygen in the para-position to X, R is ethyl and Z is ethoxycarbonyl.

5. The dyestuff claimed in claim 2 wherein $T^1$ and $T^2$ are hydrogen, $L^1$ is $NH_2$, $L^2$ is OH, X is oxygen, Y is oxygen in the meta-position to X, R is ethyl and Z is nitrile.

6. The dyestuff claimed in claim 2 wherein $T^1$ is OH, $T^2$ is $NH_2$, $L^1$ is $NH_2$, $L^2$ is OH, X is a direct link, Y is oxygen in the para-position to X, R is ethyl and Z is ethoxycarbonyl.

7. The dyestuff claimed in claim 2 wherein $T^1$ and $T^2$ are hydrogen, $L^1$ is $NH_2$, $L^2$ is OH, X is oxygen, Y is oxygen in the para-position to X, R is methyl and Z is methoxycarbonyl.

8. The dyestuff claimed in claim 2 wherein $T^1$ and $T^2$ are hydrogen, $L^1$ is $NH_2$, $L^2$ is OH, X is oxygen, Y is oxygen in the meta-position to X, R is n-propyl and Z is n-propoxycarbonyl.

9. The dyestuff claimed in claim 2 wherein $T^1$ and $T^2$ are hydrogen, $L^1$ and $L^2$ are $NH_2$, X is oxygen, Y is oxygen in the para-position to X, R is methyl and Z is methoxycarbonyl.

10. The dyestuff claimed in claim 2 wherein $T^1$ and $T^2$ are hydrogen, $L^1$ is $NH_2$, $L^2$ is OH, X is oxygen, Y is oxygen in the para-position to X, R is phenyl and Z is phenoxycarbonyl.

* * * * *